United States Patent [19]

Liu

[11] Patent Number: 5,041,818

[45] Date of Patent: Aug. 20, 1991

[54] LID WITH MOVEMENT CONTROL DEVICE

[75] Inventor: Chyi-Hsying Liu, Taipei, Taiwan

[73] Assignee: Lapro Corporation, Taiwan

[21] Appl. No.: 526,003

[22] Filed: May 21, 1990

[51] Int. Cl.⁵ .............................................. G09G 1/00
[52] U.S. Cl. .................................... 340/700; 16/342;
16/306; 16/307; 364/708
[58] Field of Search ................. 16/342, 319, 337, 306,
16/307; 340/700; 364/708

[56] References Cited

U.S. PATENT DOCUMENTS

| | | | |
|---|---|---|---|
| 2,867,345 | 1/1959 | Bellek | 16/307 X |
| 3,702,491 | 11/1972 | Pelletiere | 16/306 X |
| 4,524,438 | 6/1985 | Einhaus | 16/306 X |
| 4,730,364 | 3/1988 | Tat-Kee | 16/337 |
| 4,781,422 | 11/1988 | Kimble | 16/337 X |
| 4,852,033 | 7/1989 | Saitou | 364/708 |
| 4,901,261 | 2/1990 | Fuhs | 364/708 |
| 4,959,887 | 10/1990 | Gruenburg et al. | 364/708 X |
| 4,976,007 | 12/1990 | Lam | 16/302 |

Primary Examiner—Richard K. Seidel
Assistant Examiner—Patty E. Hong
Attorney, Agent, or Firm—Cushman, Darby & Cushman

[57] ABSTRACT

A lid arrangement for a computer or the like. One side of the lid is movably connected to a casing and has a device for controlling movement of the lid with respect to the causing. The device comprises an ear portion protruding from the movably connected side of the lid, a cover member cooperating with the ear portion to define a hollow space therebetween, a shaft member longitudinally extending between the ear portion and cover member in the hollow space, and a torsion spring fitted to and surrounding the shaft. The torsion spring has a helical portion with first and second endmost turns. Each endmost turn has an arm extending from the shaft including a straight portion and a bending portion. The bending portion of each endmost turn each has a bent portion and a tip opposite the bent portion. When the lid moves towards the casing, the bending portions are compressed in opposing directions by the ear portion and cover member, thereby controlling the lid's motion with respect to the casing.

1 Claim, 3 Drawing Sheets

5,041,818

LID WITH MOVEMENT CONTROL DEVICE

BACKGROUND OF THE INVENTION

The invention relates to a lid with a movement control device, and more particularly to a computer monitor having a device for retarding the closing action thereof by means of a hinge attached to the main casing of a conventional laptop computer.

Referring to FIG. 1, a conventional laptop computer is shown which comprise a computer monitor 91 hinged to a main casing 90. The computer monitor 91 has a lower end with a projecting ear portion having a pair of transverse projecting stubs 92 received in the main casing 90 to hinge the computer monitor 91 to the main casing 90. A main drawback of this structure is that when the computer monitor 91 is to be moved from a normally open position to a normally closed position, the user would have to support the movement of the computer monitor 91 to prevent the computer monitor 91 from slamming onto the computer keyboard and thus damaging either or both the computer monitor 91 and the computer keyboard.

SUMMARY OF THE INVENTION

Therefore, the objective of this invention is to provide a lid with a movement control device for retarding the closing movement of the lid on a casing and thus prevent slamming.

More specifically, the objective of this invention is to provide a lid having a device for retarding the closing movement thereof, where the lid comprises a computer monitor hinged to the main casing of a conventional laptop computer in order to prevent the computer monitor from slamming onto the computer keyboard of the laptop computer.

Accordingly, the preferred embodiment of a lid with movement control device having one side movably connected to a casing comprises an ear portion projecting from the lid; a cover member cooperating with the ear portion to define a hollow space; a shaft extending longitudinally between the ear portion and the cover member and having two ends fixed relative to the casing; and a torsion spring press-fitted to and surrounding the shaft in the hollow space defined by the ear portion and the cover member. The torsion spring has a helical portion with a first and a second endmost, turn. The first endmost turn comprises an arm extending from the shaft including a straight portion adjacent to the cover member, and a bending portion forming an angle with the straight portion and extending towards the ear portion. The second endmost turn comprises a similar arm extending from the opposite end of the shaft in a straight portion adjacent to and in contact with the ear portion, and a bending portion forming an angle with the straight portion of the second endmost turn and extending towards and in contact with the cover member. The bending arm portions have a bend adjacent to the straight arm portions and a tip opposite the bend. The bending arm portion of the first endmost turn is shorter than that of the second endmost turn. The bend and of tip of the second endmost turn respectively contact with the ear portion and the cover member. The tip of the first endmost turn is spaced from the ear portion. The bent portion of the first endmost turn is slightly displaced from the cover member when the lid is in a normally open position. The bending portions of the first and second endmost turns are compressed in opposite directions by the ear portion and the cover member when the lid moves towards a closed position. The torsion spring exerts a resisting force, the magnitude of which corresponds to the magnitude of the compressing force. The resisting force exerted by the torsion spring retards the closing of the lid and prevents the slamming of the lid on the casing.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 1:
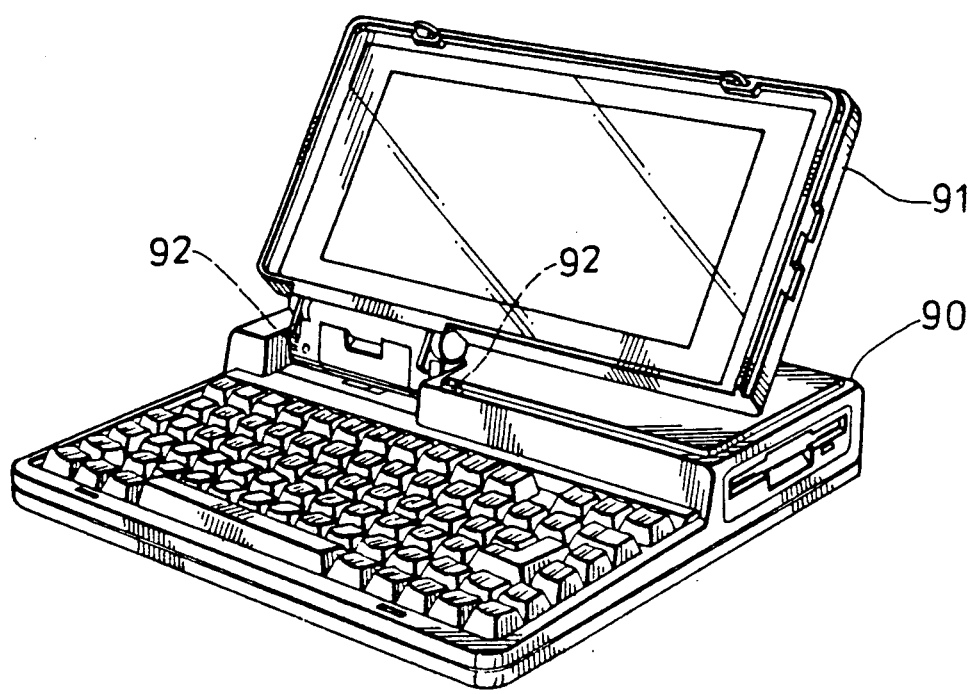
FIG. 1 is an illustration of a conventional laptop computer.
Figure 2:
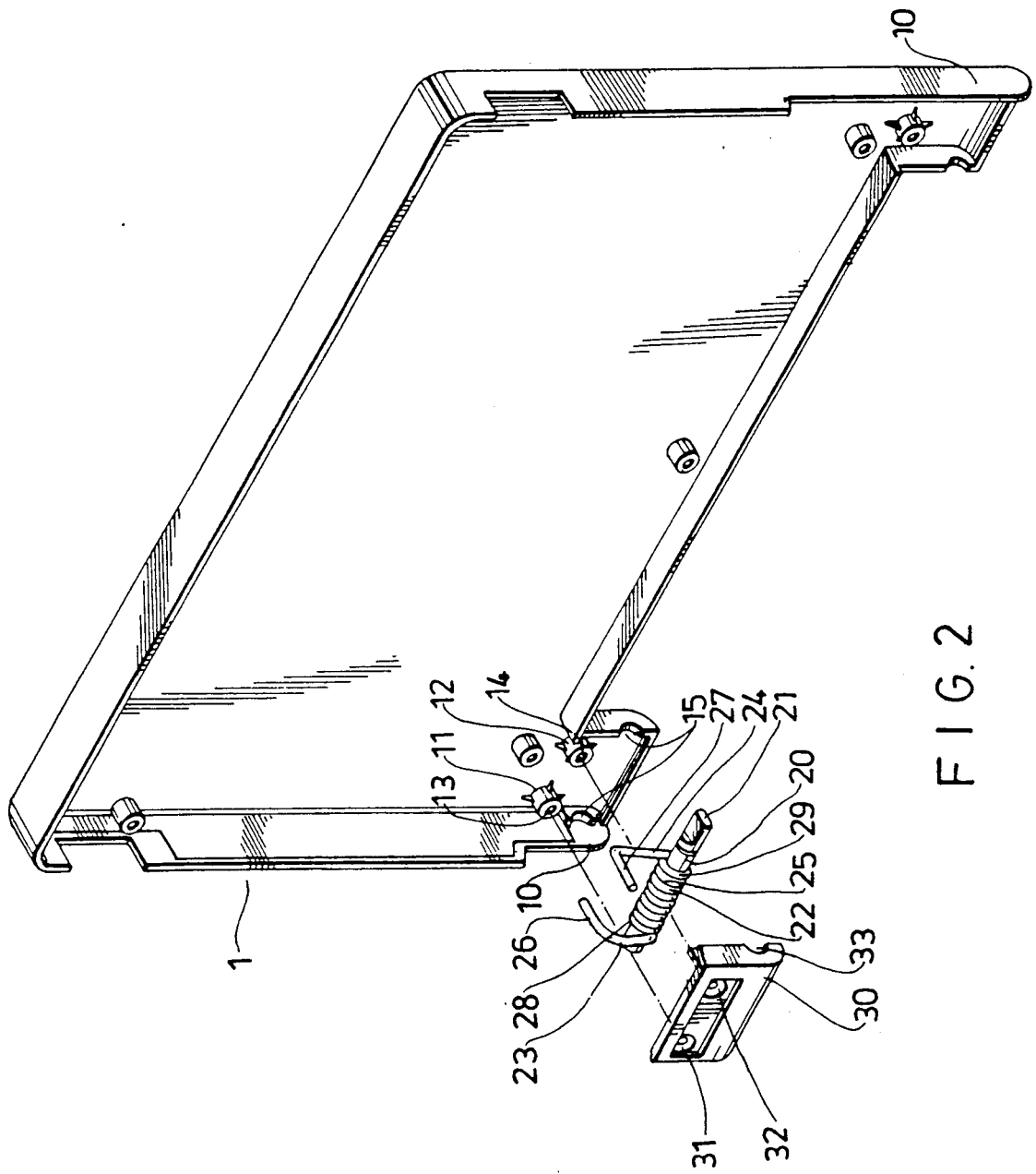
FIG. 2 is an exploded view of the preferred embodiment according to this invention.

Referring to FIG. 2, a first half of a lid 1 of a computer monitor has two downwardly projecting ear portions 10 extending from a lower side of the lid one which are to be hinged to the main casing 90 of the conventional laptop computer shown in FIG. 1. A pair of inwardly projecting stubs 11, 12 protrude from one of the ear portions 10. Each of the stubs 11, 12 has an axial screw socket 13, 14. A pair of aligned semicircular notches 15 are oppositely formed on the side walls of the ear portions 10. A shaft 20 has a substantially flat end 21. A torsion spring 22 has a diameter substantially equal to that of the shaft 20 and is press-fitted to and surrounds a portion of the shaft 20. The torsion spring 22 has a helix portion 25 with a first and a second endmost turn 28, 29. Straight portion 23 of the torsion spring 22 extends from the first endmost turn 28 of the helix portion 25. A bending arm portion 26 forms an angle with the straight arm portion 23. Similarly, a straight arm portion 24 extends from the second endmost turn 29 of the helix portion 25. A bending arm portion 27 forms an angle with the straight arm portion 24. A cover member 30 has screw holes 31, 32 and is used to cover the ear portion 10. The shape of the cover member 30 complements that of the ear portion 10. Cover member 30 has semicircular notches 33 formed therein that are complementary to semicircular notches 15 of ear portion 10.

During assembly, the shaft 20 extends between the wall 10a of the ear portion 10 and the wall 30a of the cover member 30. The flat end 21 of the shaft 20 passes through a hole formed by the notches 15, 33 of the ear portion 10 and the cover member 30. The cover member 30 10 is mounted to the ear portion 10 by using screws passing through the holes 31, 32 and the sockets 13, 14, respectively. The flat end 21 of the shaft 20 is fixed to the main casing 90, thereby preventing the shaft 20 from rotating.

Figure 3:
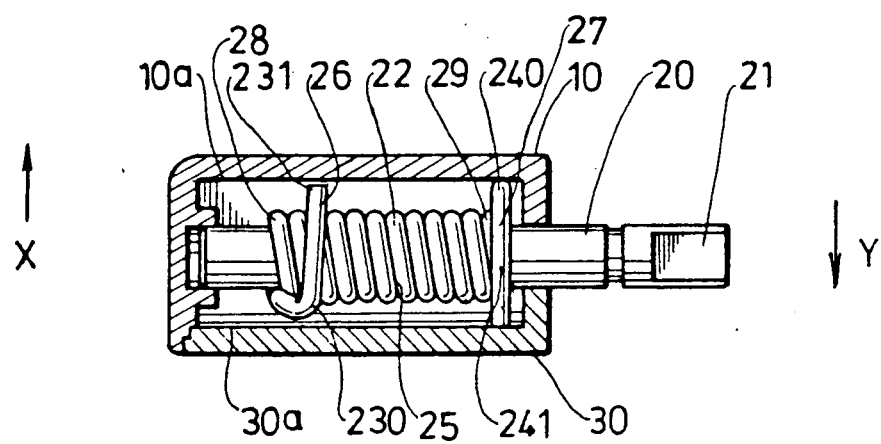
FIG. 3 is a sectional top view of the preferred embodiment when in a normally open position.

A sectional top view of the preferred embodiment when in a normally open position is shown in FIG. 3. Each of the bending arm portions 26, 27 of the torsion spring 22 has a bend 230, 240 and a tip 231, 241, respectively. The bend 230 is adjacent to the straight arm portion 23 while the tip 231 is adjacent to the ear portion 10. The bend 240 is adjacent to the straight arm portion 44 while the tip 241 is adjacent to and in contact with the cover member 30. The length of the bending arm portion 27 is substantially equal to the distance between the walls 10a, 30a of the ear portion 10 and the cover member 30. Thus, the bend 240 contacts with the ear portion 10. The length of the bending arm portion 26 is shorter than that of the bending arm portion 27. When the lid 1 is in a normally open position, the tip 231 of the bending arm portion 26 is spaced from the ear portion 10 and the bend 231 is slightly displaced from the cover member 30.

Figure 4A:
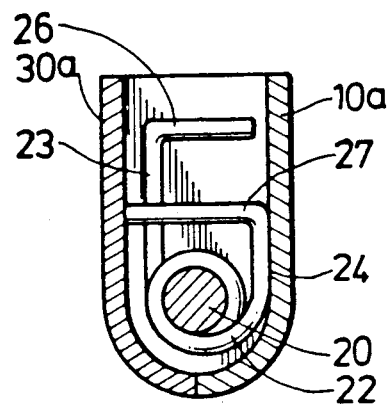
FIG. 4A is another sectional view of the preferred embodiment when in a normally open position.
Figure 4B:
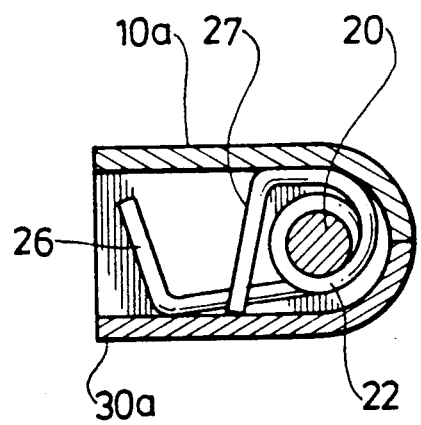
FIG. 4B is a sectional view of the preferred embodiment when in a normally closed position.

When the lid 1 moves from a normally open position to a normally closed position, in a direction as shown by the arrow Y, the ear portion 10 exerts a pressing force on the bend 240 of the bending arm portion 27 and pushes the tip 241 towards the cover member 30. The corresponding reaction of the torsion spring 22 is to move the bend 230 of the bending arm portion 26 towards the cover member 30 until the bend 230 abuts with cover member 30. Further movement of the lid 1 in the direction Y causes the compression and deformation of the and bending arm portions 26, 27 of the torsion spring 22 because of the inability of the torsion spring 22 to freely rotate on the shaft 20. Sectional views of the preferred embodiment when in a normally open position and when in a normally closed position are respectively shown in Figures 4A, 4B. The compressing force acting on the torsion spring 22 gradually increases as the lid 1 moves in the direction of Y. The torsion spring 22 exerts a resisting force which correspondingly increases with the magnitude of the compressing force. The resisting force exerted by the torsion spring 22 retards the closing of the lid 1 and prevents the slamming of the lid 1 on the main casing 90.

When the lid 1 is unlocked relative to the main casing 90, the lid 1 is moved upward in a direction indicated by the arrow X due to the expanding action of the torsion spring 22. The torsion spring 22 thus assists the lid 1 in returning to the normally open position until the torsion spring 22 recovers its normal free state.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A data processing device lid with a movement control device, for retarding closing movement of the lid with respect to a casing, comprising:

a lid having an ear portion protruding therefrom, for joining the lid to the casing, the ear portion having a pair of walls projecting perpendicularly therefrom;

a cover member having a pair of walls projecting perpendicularly therefrom and facing the ear portion walls, for covering the ear portion and defining a hollow space between the cover member and ear portion;

a shaft longitudinally extending between the ear portion walls and cover member walls in the hollow space and having a pair of ends fixed relative to the casing; and a torsion spring press-fitted to and surrounding the shaft, the torsion spring having a helical portion with first and second endmost turns, the first endmost turn comprising an arm extending from the shaft including a straight portion adjacent to the cover member walls and a bending portion at an angle extending toward the ear portion walls, the bending portion having:

a bent portion adjacent to the straight portion and spaced apart from the cover member walls when the lid is open with respect to the casing; and a tip opposite the bent portion and spaced apart from the ear wall portion;

the second endmost turn comprising an arm extending from the shaft including a straight portion adjacent to and in contact with the ear portion walls, and a bending portion at an angle extending toward and in contact with the cover member walls, the second endmost turn bending portion being longer than the first endmost turn bending portion and having:

a bent portion adjacent to the straight portion of the second endmost turn and in contact with the ear portion walls; and a tip opposite the bent portion of the second endmost turn and in contact with the cover member walls; and the first and second endmost turn bending portions are compressed in opposing directions by the ear portion walls and cover member walls when the lid moves towards the casing.

* * * * *